(12) United States Patent
Elmer

(10) Patent No.: US 10,895,141 B2
(45) Date of Patent: Jan. 19, 2021

(54) CONTROLLED HIGH PRESSURE SEPARATOR FOR PRODUCTION FLUIDS

(71) Applicant: Encline Artificial Lift Technologies LLC, Houston, TX (US)

(72) Inventor: William G. Elmer, Tyler, TX (US)

(73) Assignee: Encline Artificial Lift Technologies LLC, Houston, TX (US)

( * ) Notice: Subject to any disclaimer, the term of this patent is extended or adjusted under 35 U.S.C. 154(b) by 202 days.

(21) Appl. No.: 16/199,145

(22) Filed: Nov. 24, 2018

(65) Prior Publication Data

US 2019/0211662 A1 Jul. 11, 2019

Related U.S. Application Data

(60) Provisional application No. 62/616,119, filed on Jan. 11, 2018.

(51) Int. Cl.
*E21B 43/34* (2006.01)
*E21B 34/16* (2006.01)
(Continued)

(52) U.S. Cl.
CPC .......... *E21B 43/34* (2013.01); *B01D 17/0211* (2013.01); *B01D 17/12* (2013.01);
(Continued)

(58) Field of Classification Search
CPC .......... E21B 43/12; E21B 43/38; E21B 43/16; E21B 43/0122; E21B 21/06;
(Continued)

(56) References Cited

U.S. PATENT DOCUMENTS 3,971,719 A 7/1976 Peters
4,561,866 A * 12/1985 Altmann ............... B01D 17/048
210/188

(Continued)

OTHER PUBLICATIONS

Oil and Gas Separator—Effects of Back Pressure; Published: Sep. 25, 2009; From URL: http://www.blingasseparator.info/oil-handling-surfacefacilities/pressure-relief/relief-valve-sizing/effects-of-back-pressure.html.

(Continued)

*Primary Examiner* — Joseph W Drodge
(74) *Attorney, Agent, or Firm* — Peter L. Brewer; Thrive IP

(57) ABSTRACT

A controlled production fluids separator. The separator is configured to be placed in fluid communication with a production fluids flow line coming off of a well head. The separator includes an inlet configured to receive fluids from the flow line. The separator has a water dump valve and an oil dump valve. The separator further has a gas outlet residing along the upper surface of the vessel. The gas outlet comprises a valve configured to open and close in response to control signals. In this way, the valve serves as a back-pressure regulator valve for the separator. The separator also includes a controller. The controller is configured to periodically receive data indicative of fluid flow through the flow line, and adjust a back-pressure setpoint in real time by sending signals to the back-pressure regulator valve for opening and closing. A method of operating a three-phase production fluids separator is also provided.

34 Claims, 5 Drawing Sheets

(51) Int. Cl.
*E21B 34/02* (2006.01)
*B01D 17/02* (2006.01)
*B01D 17/12* (2006.01)
*B01D 21/30* (2006.01)
*B01D 21/34* (2006.01)

(52) U.S. Cl.
CPC ............ *B01D 21/30* (2013.01); *B01D 21/34* (2013.01); *E21B 34/02* (2013.01); *E21B 34/16* (2013.01)

(58) Field of Classification Search
CPC ........ E21B 21/063; E21B 43/34; E21B 49/00; E21B 49/08; E21B 2049/085; C02F 1/40; C02F 1/008; C02F 2209/42; B01D 17/044; B01D 17/042; B01D 17/02; B01D 17/0208; B01D 17/0214; B01D 17/12; B01D 21/10; B01D 21/24; B01D 21/2444; B01D 21/30; B01D 21/302; B01D 21/307; B01D 21/34; G01F 1/007; G01F 11/28; G01F 15/00; G01F 15/005; G01F 15/06; G01F 22/00; G01F 23/00; G01F 23/18; G01F 23/185; G01F 23/30; G01F 23/64; G01F 23/70; G01F 23/76; G01F 25/0061; G01N 1/10; G01N 1/18; G01N 1/34; G01N 1/40; G01N 33/18; G01N 33/1833; G01N 33/28; G01N 33/2823; G01N 33/2847
USPC ........ 137/2, 15.18, 552, 558, 571, 574, 575; 166/250.01, 250.03, 264–267, 75.11, 166/75.12; 175/40, 66, 206, 207; 210/739, 743, 800, 85, 86, 96.1, 94, 95, 210/103, 104, 114, 115, 121, 123, 128, 210/513, 521, 522
See application file for complete search history.

(56) References Cited

U.S. PATENT DOCUMENTS

| | | | |
|---|---|---|---|
| 7,395,864 B2 | 7/2008 | Ramachandran et al. | |
| 7,531,099 B1 | 5/2009 | Rhodes | |
| 7,575,672 B1* | 8/2009 | Gilmore | B01D 17/0211 |
| | | | 210/117 |
| 8,047,292 B2 | 11/2011 | Ramachandran et al. | |
| 8,393,398 B2 | 3/2013 | Makogon et al. | |
| 8,628,458 B2 | 1/2014 | Trager | |
| 8,657,896 B2 | 2/2014 | Gouy et al. | |
| 8,691,089 B2 | 4/2014 | Bias et al. | |
| 9,004,174 B2 | 4/2015 | Mebarkia et al. | |
| 9,114,332 B1* | 8/2015 | Liu | B01D 17/0208 |
| 9,145,309 B2 | 9/2015 | Wang et al. | |
| 9,234,400 B2 | 1/2016 | Warnock, Jr. et al. | |
| 9,468,868 B2 | 10/2016 | Chen et al. | |
| 9,828,556 B1 | 11/2017 | Rehm et al. | |
| 9,833,727 B1 | 12/2017 | Ball, IV | |
| 9,840,895 B1* | 12/2017 | Kuhn | E21B 47/04 |
| 9,937,442 B2 | 4/2018 | Hendrix | |
| 10,150,923 B2 | 12/2018 | Rehm et al. | |
| 2007/0084341 A1* | 4/2007 | Heath | C10L 3/10 |
| | | | 95/117 |
| 2012/0165995 A1* | 6/2012 | Crawley | E21B 43/01 |
| | | | 700/282 |
| 2012/0285896 A1* | 11/2012 | Black | B01D 17/047 |
| | | | 210/741 |
| 2012/0325751 A1* | 12/2012 | Renick | C02F 1/02 |
| | | | 210/739 |
| 2013/0312614 A1* | 11/2013 | Zainal Abidin | B01D 53/1425 |
| | | | 96/242 |
| 2015/0007981 A1* | 1/2015 | Shomody | E21B 36/00 |
| | | | 166/245 |
| 2015/0337218 A1* | 11/2015 | Ricotta | E21B 43/00 |
| | | | 208/187 |
| 2016/0129371 A1 | 5/2016 | Black | |
| 2017/0174530 A1* | 6/2017 | Yin | E21B 43/36 |
| 2020/0133251 A1* | 4/2020 | Rossi | G05B 23/024 |

OTHER PUBLICATIONS

Screen Shot of Three Phase Separator; National Oilwell Varco; From URL: https://www.nov.com/Segments/Completion_and_Production_Solutions/Intervention_and_Stimulation_Equipment/Surface_Well_Test/Downstream_Equipment/Three_Phase_Separator.aspx.

Dubas; Muhammad Fahad, et al.; Design of Gas Oil Separation Plant using HYSYS; Published: Oct. 2016; UNSW Australia; From URL: https://www.researchgate.net/publication/312376071_Design_of_Gas_Oil_Separation_Plant_using_HYSYS.

Charlton, J. S., & Lees, R. P.; The Future of Three Phase Separator Control; Published: Jan. 1, 2002; Society of Petroleum Engineers; Melbourne, Australia.

Kokal, S. L., & Al Ghamdi, A.; Oil/Water Separation Experience From a Large Oil Field. vol. 21; Issue 03; Published: Aug. 1, 2006; Society of Petroleum Engineers.

Smith, H. V.; Oil and Gas Separators; Published: Jan. 1, 1987; Society of Petroleum Engineers.

Burrell, G. R.; Automation of Lease Equipment; Published: Jan. 1, 1987; Society of Petroleum Engineers.

Havre, Kjetil, et al.; Taming Slug Flow in Pipelines; Published circa 2000 in ABB Review.

Havre, K., & Dalsmo, M.; Active Feedback Control as a Solution to Severe Slugging; vol. 17; Issue 03; Published Aug. 1, 2002; A Society of Petroleum Engineers.

* cited by examiner

CONTROLLED HIGH PRESSURE SEPARATOR FOR PRODUCTION FLUIDS

CROSS REFERENCE TO RELATED APPLICATIONS

This application claims the benefit of U.S. Ser. No. 62/616,119 filed Jan. 11, 2018. That application is entitled "Controlled High Pressure Separator For Production Fluids," and is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present disclosure relates to the field of hydrocarbon recovery operations. More specifically, the present invention relates to the separation of production fluids at the surface, and methods for optimizing the separation of production fluids. The invention also relates to a controlled high pressure separator wherein a back-pressure setpoint is adjusted in real time.

Technology in the Field of the Invention

The production of reservoir fluids from a hydrocarbon-producing well causes a mixture of gas and liquid components to be brought to the surface. The gas, or compressible components, may comprise methane, ethane, propane and trace amounts of butane. In addition, the compressible components may include carbon dioxide, nitrogen and hydrogen sulfide.

The liquid, or incompressible components, will typically comprise oil in the form of propane, butane, pentane and heavier (or C+) components. In addition, the incompressible components may and frequently will include brine. Dissolved minerals or precipitates, mostly commonly salts, will be carried with the liquids.

The operator will desire to separate the produced fluids at the surface into its component parts. Various types of separator hardware are known. These include gravity separation vessels, centrifugal separators, zeolite (or other membrane) bed separators, and so-called heater treaters. These may be used individually or in series.

It is desirable to capture light hydrocarbon gases for sale as soon as possible. In some cases, a portion of the captured gases will be reinjected into the back side of the well in support of a gas lift operation. Such gas lift operations may include intermittent gas lift and plunger lift.

It is also desirable to separate the hydrocarbon components from the water. Separated water can be reinjected through so-called injectors for disposal. Frequently today, produced brine is sold (or at least passed off) to a service company for use in connection with hydraulic fracturing operations.

As a means of making an initial fluid separation, a three-phase separator may be placed near the production facility. A three-phase separator is a large vessel used at the surface to separate well effluent into three general phases, to wit, water, oil and gas. Such separators are typically horizontal vessels provided on skids for ease of transport to a well site or field.

Three phase separators include an inlet that receives production fluids directly from the well head via a flow line. The inlet will carry the production fluids into an inlet diverter within the separator. Gases will rise to the top of this initial separation zone, while liquids will gravitationally fall to the bottom of the horizontal vessel.

As the liquids move through the vessel under pressure, they may travel through or across baffles. The baffles represent "internals" that facilitate the separation of the production fluids and the further separation of gases out of solution. Gases will then travel to a mist extraction device at or near an outlet end while the liquids will move to a gravity separator zone.

The gravity separator zone facilitates gravity settling of liquids, allowing hydrocarbon components to rise to the surface of the vessel while the heavier water falls to the bottom. One or more weirs may be provided to control the oil/water interface level. As described further below, separate oil and water dump valves are provided along the bottom of the separator and on opposing sides of a last weir to carry away produced liquids.

Additional chambers may optionally be provided for de-gassing and water knock-out. Either way, it is generally desirable for the oil outlet line to have less than 1% (by volume) water and less than 5 lbm water/MMscf gas. The composition of production fluids may affect the separation process required to reach the desired oil standard.

During production, the three-phase separator is in direct fluid communication with the flow line emanating from the well head. The well head senses fluid pressure at the reservoir through the production tubing. This pressure, in turn, is sensed at the inlet to the separator, subject to a decrease caused by line friction or so-called "flow line pressure loss." One might say then that the separator is a "wide spot" in the flow line.

For vertical wells, the pressure at the separator inlet will not fluctuate a great deal on a daily basis, although over time production pressures will tend to decline until the well is placed on gas lift. However, for horizontally completed wells the tubing pressure (and corresponding separator inlet pressure) will experience considerable pressure fluctuations each day due to the phenomenon of slug flow.

Slug flow is typically found in undulating legs of horizontally completed wells. Slug flow is characterized by alternating cycles of gas flow and liquid flow from the horizontal leg and into the production tubing. The presence of slug flow means there will be periods of time when the pressure will rise significantly in the flow line, followed immediately by a significant increase within the three-phase separator of a high rate of liquid in-flow.

In operation, as production fluids pass through the separator, liquids will fall to the bottom of the separator, where they exit through the oil and water dump valves. If these valves are sized and working correctly, all liquids will exit through the bottom of the separator and only gas vapor is left in the vessel. This gas will accumulate as it is not allowed to exit the liquid dump valves. The accumulation of gas manifests as rising pressure within the separator. Once the pressure rises above a setpoint provided for a back-pressure regulator valve on the top of the vessel, the gas will be allowed to exit the separator. From there, gaseous fluids will enter a lower pressure system such as a gas compressor inlet or a gas sales line.

Of interest, the back-pressure regulator valve does not care what is flowing through it, whether liquid or gas; it simply opens and closes with pressure changes. In contrast, liquid dump valves only open and close based on liquid levels. Thus, it is the setpoint for the back-pressure regulator valve that effectively determines how much back-pressure will be exerted on the well.

Those of ordinary skill in the art will understand that the back-pressure regulator valve on the top of the vessel can open and close quickly, allowing gas to be readily released when the pressure setpoint is met. On the other hand, the oil and water dump valves are constrained by the orifice sizes as well as the operational speed or responsiveness of the actuators controlling the water and oil dump valves. In the event of a liquid surge within the vessel, liquid will come into the separator from the flow line at a rate faster than the dump valves can drain liquid from the separator. In this instance, liquid levels within the vessel will rise until the vessel is entirely filled with oil and water. At this point, a high liquid level switch will send a signal to shut down the well.

In the absence of the high liquid level switch that shuts in the well, liquids would begin flowing out of the top of the separator (along with the gas). This liquid would deleteriously impact the downstream gas compressor or gas sales line equipment. From a facilities standpoint, the shut-off signal is beneficial, but to the operator of the well it is a nuisance. A field worker will need to be called out to the well site to re-start the well.

In some instances, the operator will adjust the back-pressure setpoint. This involves a field hand going out to the remote well location with a wrench and adjusting a spring in the back-pressure regulator valve (or making other mechanical adjustment). By elevating the pressure setting of the back-pressure regulator valve, the field worker can directly increase the ability of the liquid dump valves to remove the separator liquids. This, in turn, prevents the liquid level from building up high enough to trip the high liquid level sensing device and causing an ESD (Emergency Shut Down).

It is understood that this provides only a limited solution. A next larger liquid surge may cause yet another shut-down signal to be generated. An operator could place a choke on the flow line before the inlet of the separator in an effort to smooth out inlet pressures just a bit. However, operators do not wish to do this as it causes the reservoir fluids coming up the production line to flow against a back-pressure caused by the choke, limiting the production rate.

The operator may choose to maintain a higher pressure setpoint for the back-pressure regulator valve, even though the higher pressure setting is only needed during events of high liquid rate entry. However, this too places extra back-pressure on the well, hurting its long-term performance—as well as the operator's profitability. Alternatively, the operator may move the back-pressure setpoint back down later, hoping that a next liquid surge won't occur. This is enticing as the well will once again see the lower flowline pressure and produce at a higher rate. In any event, this is a manual, trial-and-error process.

Accordingly, a need exists for a controlled separator that recognizes when a temporary liquid surge through the flow line is about to take place, and temporarily raises the setpoint of the back-pressure regulator valve. This keeps the back-pressure regulator valve in the separator in a closed state until the vessel pressure rises to the higher setpoint. Should high levels persist, a controller will adjust the setpoint higher as needed while staying within maximum allowable working pressure limitations of the vessel to coerce the liquids to leave the separator promptly. In this way, high fluid level shut-downs are prevented. In addition, a need exists for a method of separating production fluids at a well site using a high-pressure phase separator wherein back-pressure on the vessel is controlled in real time. Still further, a need exists for a sensor network for a fluid separator system wherein signals are sent from sensors to an on-site controller in real time to make temporary increases in the back-pressure setpoint.

BRIEF SUMMARY OF THE INVENTION

A production fluid separator is first provided herein. The fluid separator is designed to operate at a well site and to receive production fluids from a flow line connected to a well head.

The fluid separator first comprises a pressure vessel having a wall. The pressure vessel is preferably a horizontal vessel having an inlet end and an outlet end. The inlet end includes an inlet configured to receive production fluids from the flow line. The vessel will further comprise an upper surface and a lower surface.

The fluid separator will further comprise:
a gas outlet along the upper surface of the vessel;
a water dump valve along the lower surface of the vessel; and
an oil dump valve also along the lower surface of the vessel.

The gas outlet is preferably proximate the outlet end. Each of the water and oil dump valves includes an actuator configured to open and close the respective dump valves in response to liquid-level control signals.

The fluid separator also includes a back-pressure regulator valve. The back-pressure regulator valve (or gas outlet valve) controls the opening and closing of the gas outlet. The back-pressure regulator valve also includes an actuator configured to open and close the gas outlet in response to control signals.

The fluid separator further includes a controller. The controller is configured to periodically receive signals (or "data") indicative of fluid flow through the flow line, and adjust a pressure setpoint for sending signals to the gas outlet control valve for opening and closing the gas outlet. The data may include any of:
(i) flowline pressure;
(ii) separator pressure;
(iii) oil level within the separator;
(iv) water level within the separator;
(v) oil flow meter;
(vi) water flow meter; and
(vii) combinations thereof.

The processor is programmed to determine changes in selected parameters as a function of time. The pressure setpoint is adjusted in real time in response to such changes in order to limit emergency shut-downs at the well head.

In one aspect, the back-pressure regulator valve comprises an I to P transducer along with an actuator (such as a so-called motor valve) that affects variable back-pressure setpoints for the separator. When the controller determines that the data is indicative of a rising liquid level, the controller is configured to send a signal to the motor valve to increase the back-pressure setpoint. Then, when the controller determines that the data is no longer indicative of a rising liquid level, the controller is configured to send a signal to the motor valve to decrease the back-pressure setpoint.

A method of operating a production fluids separator is also provided herein. The method first includes providing a production fluids separator. The separator comprises:

- a wall having an inlet end, an upper surface and a lower surface;
- an inlet configured to receive production fluids from the flow line;
- a gas outlet residing along the upper surface of the vessel, the gas outlet comprising a valve configured to open and close the gas outlet in response to control signals, wherein the outlet valve serves as a back-pressure regulator valve for the separator;
- a water dump valve residing along the lower surface of the vessel, the water dump valve comprising an actuator configured to open and close the water dump valve in response to water level control signals;
- an oil dump valve also residing along the lower surface of the vessel, the oil dump valve comprising an actuator configured to open and close in response to oil level control signals; and
- a controller.

In accordance with the method, the controller is configured to periodically receive data indicative of fluid flow through the flow line. The controller then adjusts a pressure setpoint in real time by sending signals to the back-pressure regulator valve for opening and closing the gas outlet, thereby controlling back-pressure and limiting emergency shut-downs at the well head.

The method also includes placing the inlet of the separator in fluid communication with a reservoir fluids flow line extending from a well head. The well head receives reservoir fluids from a production tubing within a wellbore.

Preferably, the separator is a three-phase fluid separator and the inlet of the separator is along the inlet end. In any event, the wall forms a generally horizontal pressure vessel.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1A:
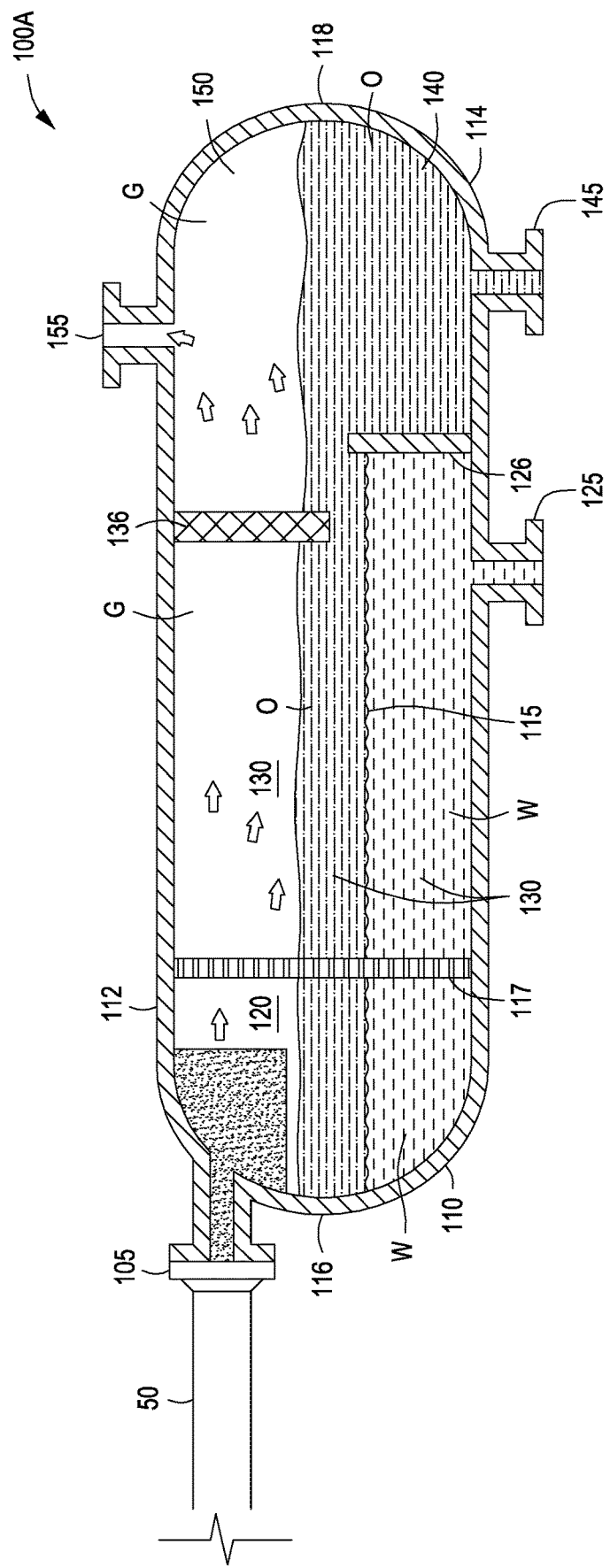
FIG. 1A is a cross-sectional view of a known, three-phase fluid separator as may be used at a well site for the separation of production fluids, in a first embodiment.

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, carbon dioxide, and/or sulfuric components such as hydrogen sulfide.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions or at surface condition. Hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the terms "produced fluids," "reservoir fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, nitrogen, carbon dioxide, hydrogen sulfide and water.

As used herein, the term "fluid" refers to gases, liquids, and combinations of gases and liquids, as well as to combinations of gases and solids, combinations of liquids and solids, and combinations of gases, liquids, and solids.

As used herein, the term "wellbore fluids" means water, hydrocarbon fluids, formation fluids, or any other fluids that may be within a wellbore during a production operation.

As used herein, the term "gas" refers to a fluid that is in its vapor phase. "Gas" may be referred to as a compressible fluid.

As used herein, the term "subsurface" refers to geologic strata occurring below the earth's surface.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types that contribute to or are encountered in, for example, without limitation, (i) the creation, generation and/or entrapment of hydrocarbons or minerals, and (ii) the execution of processes used to extract hydrocarbons or minerals from the subsurface region.

As used herein, the term "wellbore" refers to a hole in the subsurface made by drilling or insertion of a conduit into the subsurface. A wellbore may have a substantially circular cross section, or other cross-sectional shape. The term "well," when referring to an opening in the formation, may be used interchangeably with the term "wellbore."

DESCRIPTION OF SELECTED SPECIFIC EMBODIMENTS

FIG. 1A provides a cross-sectional view of a known horizontal separator 100A used for three-phase fluid separation at a well site. It can be seen that the separator 100A generally defines a horizontal steel tank 110. The steel tank 110 is a pressure vessel that has an upper surface 112 and a lower surface 114.

The tank 110 has one inlet 105 and three outlets 125, 145, 155. The inlet 105 represents a nozzle that receives all production fluids from the well head (not shown) via a production flow line 50. Preferably, the inlet 105 is at or proximate to one end (an "inlet end" 116) of the tank 110, and at or near the top surface 112. The outlets, in turn, represent a water outlet 125, an oil outlet 145 and a gas outlet 155. The water outlet 125 and the oil outlet 145 reside along the bottom surface 114 while the gas outlet 155 resides along the top surface 112. Preferably, the oil outlet 145 and the gas outlet 155 reside opposite the inlet 105, proximate an outlet end 118.

As production fluids flow through the inlet 105, they enter a primary separation zone 120. Here, liquids will gravitationally fall towards the bottom surface 114 of the separator 100 while gas will break out of solution and rise towards the top surface 112. A body having baffles 117 is optionally placed along the tank 110 in vertical orientation. The baffles 117 facilitate phase separation inside the separator 100.

As the liquids flow through the baffles 116, they enter a liquid collection zone 130. Here, water and oil form a defined interface 115. A weir 126 is provided in vertical orientation within the tank 110 to facilitate oil and water separation.

Above the liquid collection zone 120 is a gravity settling zone 130. In this zone 130, gases continue to flash off of the liquids and collect along the upper surface 112 of the tank 110. A vertical droplet coalescence zone 136 is provided to facilitate removal of liquids from gases.

As fluids move along the tank 110 towards the outlet end 118, they will encounter a weir 126. The heavier liquid components made up of water will be trapped by the weir 126 and will drop out of the liquid collection zone 120 through the water outlet 125. At the same time, lighter fluid components made up of oil will travel over the weir 126 and enter an area of the tank 110 that serves as an oil collection zone 140. The oil then drops out of the oil outlet 145 at the bottom of the oil collection zone 140.

Finally, compressible components pass into a gas collection zone 150. The gas collection zone 150 is above the oil collection zone 140. Gases will exit the tank 110 away from the gas collection zone 150 and through the gas outlet 155. The gaseous components may be carried away for further processing, such as through the use of amines or through cryogenic distillation to remove impurities in order to meet gas pipeline sale specifications.

Figure 1B:
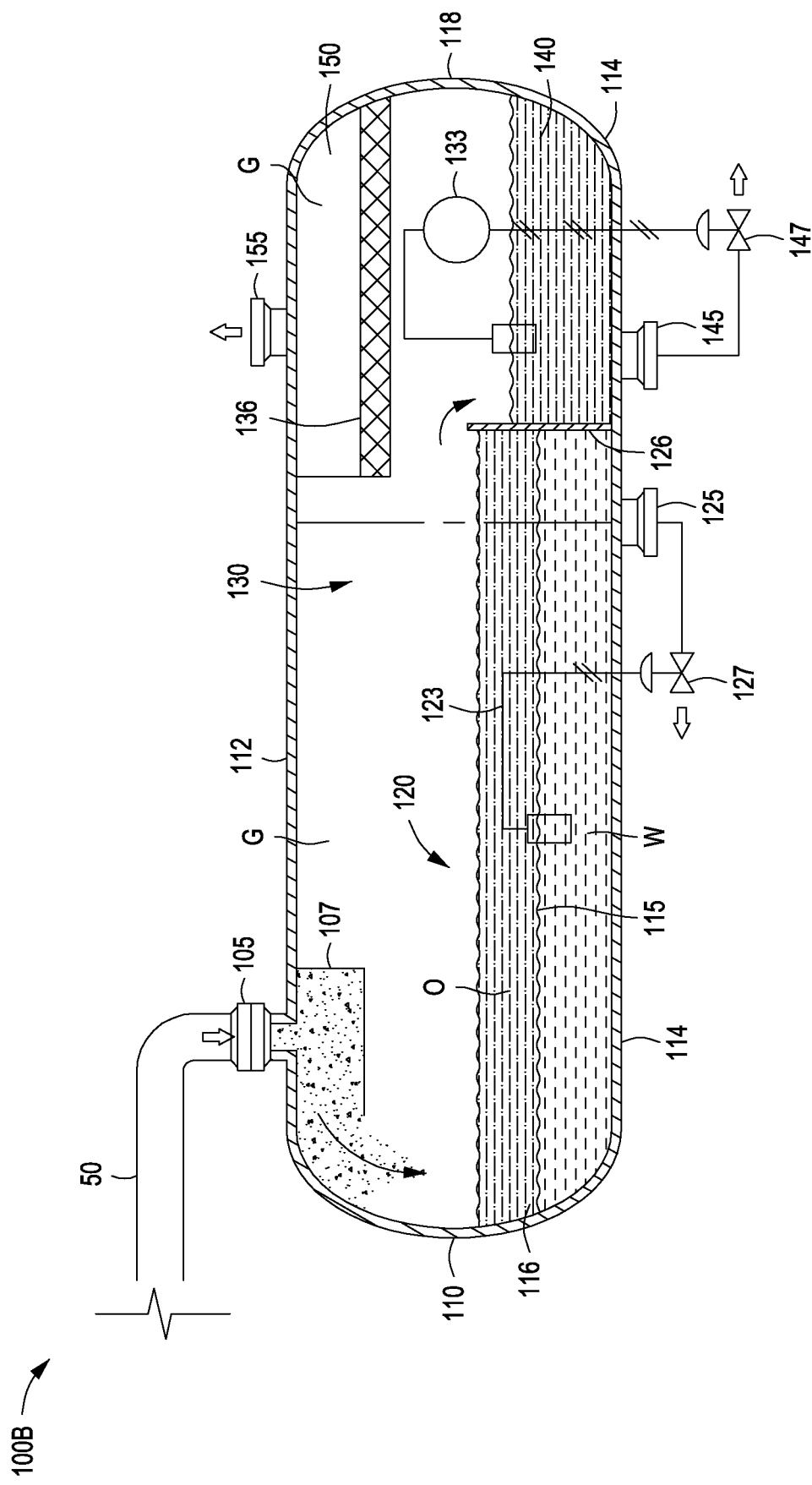
FIG. 1B is another cross-sectional view of a known, three-phase fluid separator as may be used at a well site for the separation of production fluids, in a second embodiment.

FIG. 1B is another cross-sectional view of a three-phase fluid separator 100B as may be used at a well site for the separation of production fluids, in a second embodiment. The separator 100B is designed generally in accordance with the separator 100A. In this respect, the separator 100B also defines a horizontal steel tank 110 having an upper surface 112 and a lower surface 114.

The separator 100B again has one inlet 105 and three outlets 125, 145, 155. Of interest, the inlet 105 is disposed here along the upper surface 112 of the pressure vessel 110 (but still proximate the inlet end). In this case, an inlet diverter 107 is optionally provided to direct production fluids as they enter the separator 100.

Production fluids are received through a flow line 50. As production fluids flow through the flow line 50 and into the inlet 105, they enter a primary separation zone 120. Here, liquids will again fall towards the bottom surface 114 of the separator 100 while gas will flash back towards the top surface 112. As the liquids fall into the vessel 100B, they enter a liquid collection zone 130. There, water and oil form a more defined interface 115.

A weir 126 is provided in vertical orientation within the tank 110. The weir 126 is dimensioned to hold a volume of fluids within the liquid collection zone 130. This facilitates gravitational separation of oil from water.

Above the liquid collection zone 120 is a gravity settling zone 130. In this zone 130, gases flash off of the liquids and collect along the upper surface 112 of the tank 110. A horizontal mist extractor 136 is optionally provided to facilitate removal of liquids from gases.

As with separator 100A, liquids in separator 100B will fall through the bottom surface 114 of the vessel 110. Water falls through the water outlet 125 at the bottom of the liquid collection zone 120 while oil falls through the oil outlet 145 at the bottom of the oil collection zone 140. A water outlet valve 127 is provided to control the flow of water from the water outlet 125. Similarly, an oil outlet valve 147 is provided to control the flow of oil from the oil outlet 145.

The separator 100B offers a level control 133. The level control 133 monitors a level of oil in the oil collection zone 140. This is typically a float-operated pneumatic level controller. This pneumatic level sensor resides in the oil collection zone 140. Once an oil volume reaches a certain level, a signal is sent to actuate a valve that opens the oil outlet 145. This mechanism is collectively referred to as an oil dump valve. The valve 147 of FIG. 1B may be configured to serve as the oil dump valve.

A similar level control 123 is provided to monitor the fluid interface 115. This is an oil/water interface float switch. This switch 123 is a pneumatic level sensor that resides within the liquid collection zone 130. Once the water volume reaches a certain level, a signal is sent to actuate a valve that opens the water outlet 125. This mechanism is collectively referred to as a water dump valve. The valve 127 of FIG. 1B may be configured to serve as the water dump valve.

In both cases, the liquid dump valves 127, 147 are opened and closed based on sensed liquid levels. The rate in which the liquid dump valves 127, 147 pass fluid is dependent upon the size of the valve openings and the pressure acting upon the liquids when the valves 127, 147 are opened. In one aspect, the valves 127, 147 are motor valves located adjacent to the water outlet 125 and the oil outlet 145, respectively.

Finally, compressible components pass into the gas collection zone 150 above the oil collection zone 140. Here, the mist extractor 136 is horizontal. Gases will exit the tank 110 away from the gas collection zone 150 and through the gas outlet 155. The gaseous components may be carried away for sale or gas-lift compression services or, alternatively, for further processing such as through the use of a heater treater or amine vessels.

Figure 2:
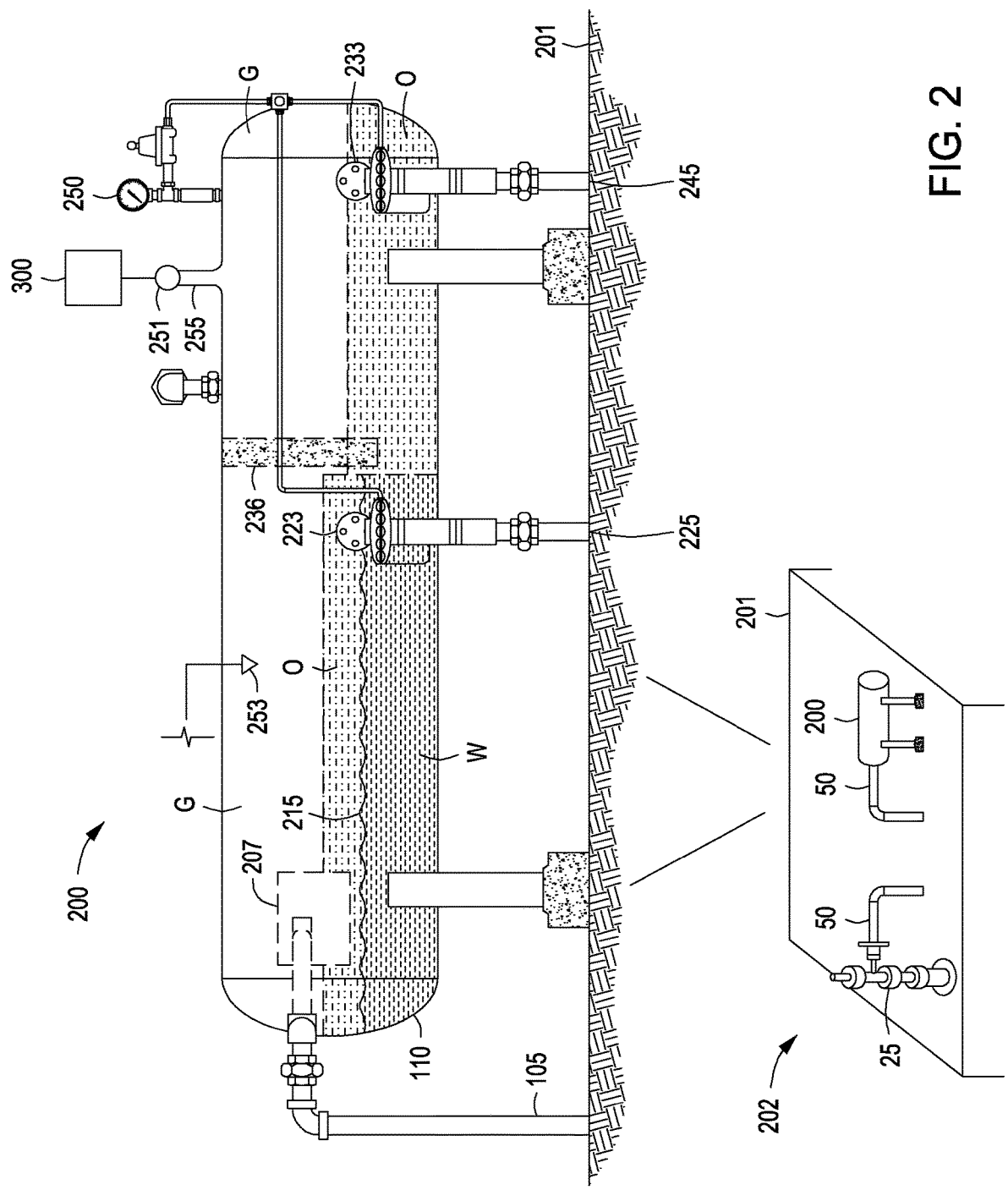
FIG. 2 is a schematic illustration of a horizontal three-phase fluid separator of the present invention, in one embodiment, that may be used for the separation of production fluids. Here, various control valves and gauges are shown along with a novel controller.

FIG. 2 is a schematic illustration of a horizontal three-phase fluid separator 200 that may be used for the separation of production fluids in the current invention. The fluid separator 200 is located at a surface 201 proximate a well site 202. The surface 201 represents a land surface. However, it is understood that the surface 201 may alternatively represent a production vessel operating offshore.

The separator 200 operates generally in accordance with separators 100A and 100B. Therefore, common features will not be discussed again. The separator 200 may be located in relative proximity to a well head 25 where hydrocarbon fluids are produced from a subsurface formation up to the surface 201. More preferably, the separator 200 is located some distance away from the well head 25—a situation that creates more problems with level issues.

Separator 200 is presented as showing various control valves and gauges. These include a water level controller (or control valve) 223 and an oil level controller (or control valve) 233. These also include a pressure regulator 250 that is used only for supplying low pressure motive gas for dump valve operation.

Also provided is a high liquid level sensor 253. This is associated with a high-level float switch or, alternatively, a liquid-sensor transducer. In the event liquids are detected by this sensor 253, an emergency shut-down signal is sent to the adjoining well 25 to keep the vessel 200 from completely filling with liquids.

As discussed above, the gas outlet 255 is controlled by a back-pressure regulator 251. The back-pressure regulator valve 251 will have a setpoint. A primary job of lease operators is to manually set the back-pressure setpoint. The setpoint is moved to higher levels when fluids are not leaving the separator 100 fast enough. Reciprocally, the operator will manually lower the setpoint to reduce well back-pressure when fluid volumes or slugging issues subside. Of interest, if the operator sets the setpoint pressure too low, then nuisance equipment ESD's (or "Emergency Shut Downs") occur. This results in overtime call-outs and lost well production. On the other hand, if the operator sets the setpoint pressure too high, then the well experiences elevated back-pressure which restricts production by exerting additional back pressure on the flow line 50 and subsequently on the formation.

The result of all of this is that operators often set the setpoint pressure much higher than needed, putting additional back-pressure on the well. The amount of back-pressure would ideally be similar to the pressure decrease caused by the decrease in the tubing gradient. For example, if the tubing gradient drops by an average of 0.05 psi per foot on a 10,000 foot well, this equates to 500 psi. Unfortunately, simply looking at the tubing and casing pressures does not tell us if the tubing gradient is falling. This is because gas frictional pressure losses resulting from high flowrates take the place of the lost hydrostatic pressure.

As noted, one option to control ESD's is to install a choke on the wellhead 25 to create short term pressure drops similar to the loss in tubing gradient. However, a more viable alternative as presented herein is to temporarily elevate separator pressure automatically. Elevating the separator pressure not only elevates the back-pressure on the well, but also increases the rate that liquids can exit the production separator. For example, a pressure increase from 60 psi to 260 psi more than doubles the flowrate across the valves 127 and 147.

In view of this, it is desirable to automate the pressure setpoint process, and also optimize the setpoint during separator operation. To this end, a unique, custom controller 300 is provided for a production fluids separator. In addition, a unique sensor network that includes a controller is provided.

For the present application, the controller 300 may be a programmable logic controller (PLC). Alternatively, the controller 300 may be an embedded controller, or any controller suitable for oil well applications environments. In one aspect, the controller 300 is capable of performing proportional-integral-derivative (PID) loop control or a subset such as PI loop controls. If the controller 300 is a PLC, the programming language is typically ladder logic. In the case of an imbedded controls implementation, the programming software is typically some form of "c" such as c or c++, or perhaps a version of Basic such as T Basic.

In one embodiment, the controller 300 is a Triangle Research EZ Wire 1616 that provides integrated, field wiring ready I/O terminals, also known as Quick-Connect Terminals. The Triangle Research EZ Wire 1616 controller is an embedded programmable logic controller that is able to perform advanced floating point math. Triangle Research EZ Wire 1616 has 16 digital inputs and 16 digital outputs.

The controller 300 provides digital and analog I/O points with its own power (+24V or +5V) and 0V on a 3-level screwless terminal. In one embodiment, the controller 300 has eight analog inputs and four analog outputs. Every sensor and actuator in a control system can be wired directly to the controller 300 without requiring additional screw terminal blocks and wire-harnesses.

The controller 300 optionally includes an Ethernet port. The Ethernet port may connect to other devices or web servers for control or data up/down loading. The controller 300 additionally includes a back-up battery.

The controller 300 is in electrical communication with the back-pressure regulator valve 251. This may be through either a wired or a wireless communication network. Signals may be sent from the controller 300 to the back-pressure regulator valve 251 or other sensors.

In one embodiment, a pair of pressure controllers is installed on the separator back-pressure regulator valve 251. A first controller is set at a first pressure setpoint and a second controller is provided at a second pressure setpoint. The first setpoint is at a preferred low operating pressure, such as 75 psig, while the second setpoint is at an elevated pressure designed to accommodate a liquid surge caused by slug flow, such as 300 psig. In this embodiment, a three-way solenoid may be provided. The PLC-controlled solenoid determines which pressure controller signal is directed to the motor valve on the gas outlet 255.

It is noted that this arrangement is binary. In this respect, the back-pressure regulator valve 251 is set at either the low pressure setpoint or the elevated pressure setpoint. To prevent sudden blowdowns when the controller 300 directs the solenoid to revert from the elevated setpoint (using, e.g., a 300 psig controller) back to the operating setpoint (using, e.g., a 75 psig setpoint), a differential pressure controller may be used that limits (or slows the rate of) opening of the gas outlet 255. The differential pressure controller may be, for example, a Kimray PDC-100 pilot.

As an alternative, the pressure setpoint may be incrementally set using a "smart" controller 300. Here, the controller 300 performs PID control of the back-pressure regulator valve 251 by utilizing a 4-20 mA output to an I to P transducer. The I to P transducer changes the 4-20 mA output to variable pressure, which adjusts the back-pressure motor valve position. Alternatively, signals may be communicated via Modbus or ethernet. In one option, a control valve such as the Fisher D4 valve incorporating the transducer may take the 4-20 mA output directly to control the pressure.

In any instance, the controller 300 is programmed to monitor data related to the flow of reservoir fluids from the wellhead 25. In the event the data indicates a rising liquid level due to a pressure surge in the production tubing, an appropriate signal is sent to the back-pressure regulator valve 251 to automatically increase the pressure setpoint, in real time.

Figure 3:
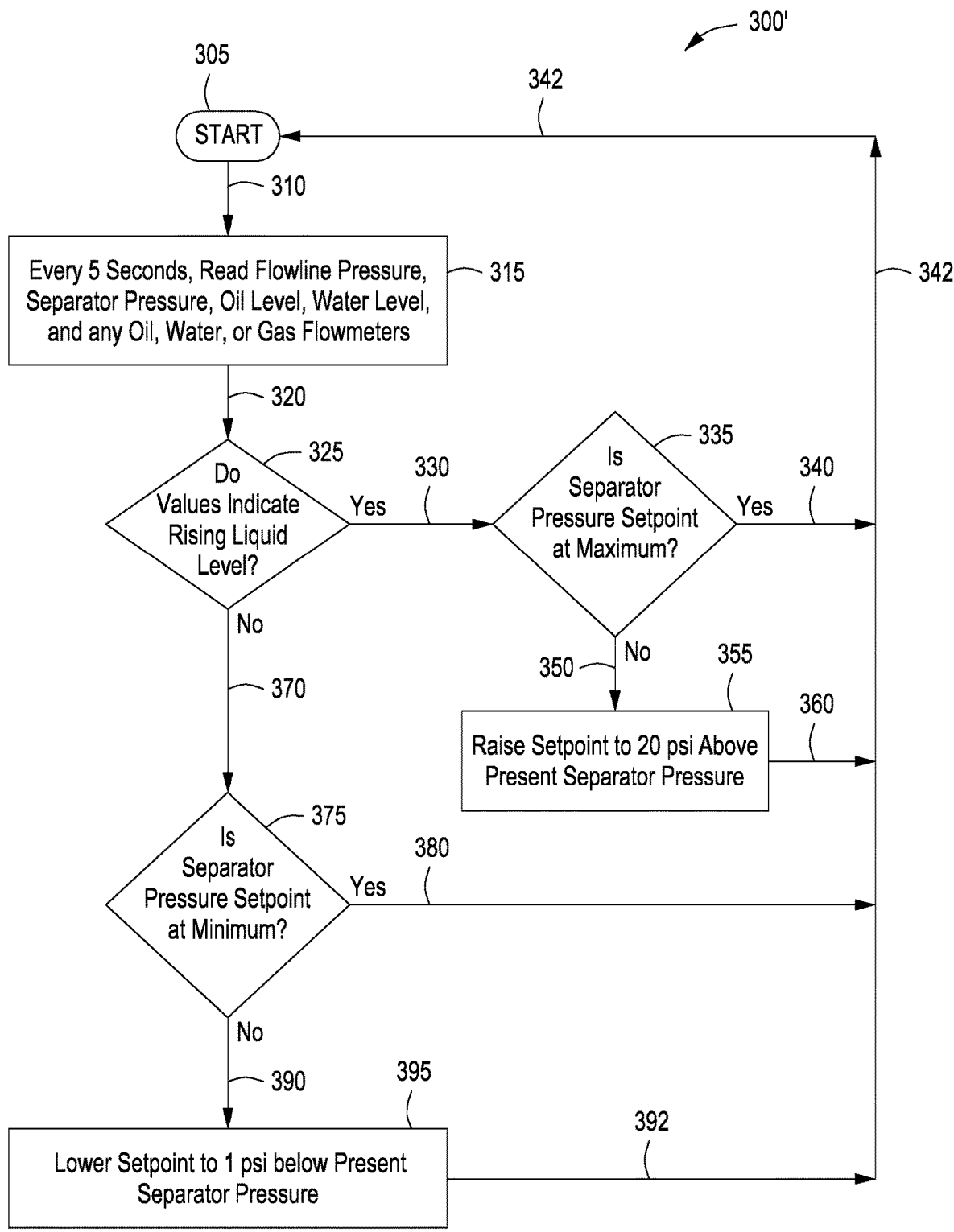
FIG. 3 is a flow chart showing operational steps for controlling the back-pressure setpoint for a fluid separator pressure such as the separator of FIG. 2, in one arrangement.

FIG. 3 is a flow chart 300' showing operational steps for optimizing the back-pressure regulator valve 251 for a fluid separator 100A or 100B or 200, in one arrangement. The operational steps are performed by the "smart" controller 300.

FIG. 3 first shows a Start block 305. This indicates that the controller 300 is ready to implement a control routine. The routine moves along arrow 310 to a command box. This is shown at Box 315.

In Box 315, the controller 300 collects data while the well is producing. In one aspect, data is collected every 0.5 to 15 seconds, and more preferably every 5 seconds. Scada automation equipment may be used to collect data, including the following analog inputs:

(i) Flowline pressure at or near the wellhead;
(ii) Separator pressure;
(iii) Water liquid level position (0 to 100%);
(iv) Oil liquid level position (0 to 100%);
(v) Oil meter;
(vi) Water meter; and
(vii) Gas meter (rate and differential pressure).

Figure 4:
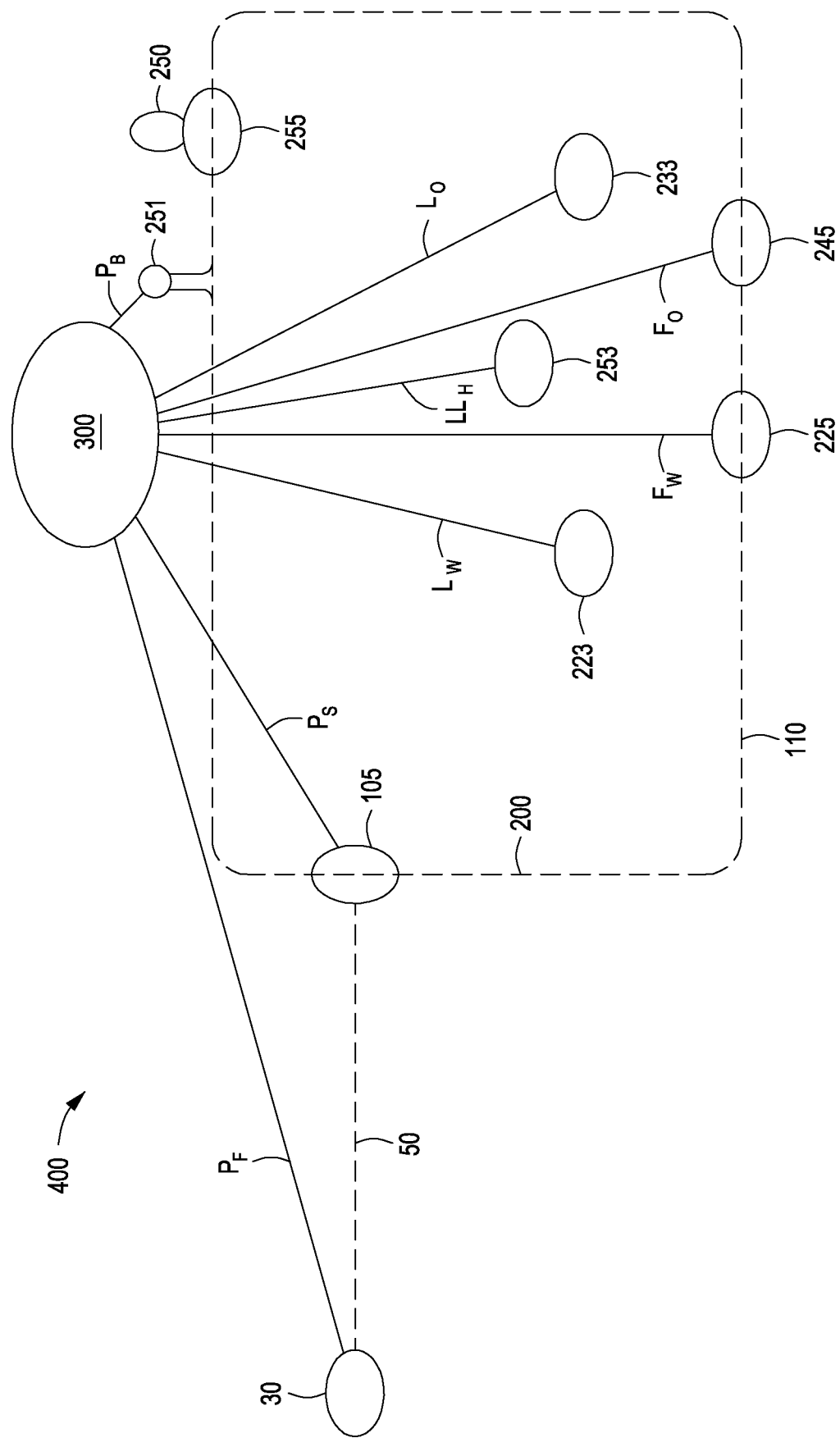
FIG. 4 is a schematic view of a sensor network of the present invention, in one embodiment.

For collecting the data in Box 315, the controller 300 receives signals from various sensors. FIG. 4 is a schematic view of a sensor network 400 of the present invention, in one embodiment. Representative sensors are shown relative to a separator 200. FIG. 4 shows the separator 200 of FIG. 2 in phantom lines. FIG. 2 also shows the production fluids flow line 50 in a phantom line.

Various items of hardware from FIG. 2 are also presented in schematic form. These include the inlet 105, the tank wall 110, the water dump valve 225 and the oil dump valve 245. Also shown is the gas outlet 255 and the associated back-pressure regulator valve 250. Additionally, the water level sensor 223, the oil level sensor 233 and the high liquid level sensor 253 are all seen. Also of interest, a pressure sensor 30 is indicated along the flow line 50 and proximate a well head (not shown).

The various sensors send signals to the controller 300. The signals include:

Signal $P_F$ providing pressure data along the flow line proximate the well head;
Signal $P_S$ providing pressure data for the separator, such as at or near the tank inlet;
Signal $F_O$ providing flowmeter data from the oil dump valve;
Signal $F_W$ providing flowmeter data from the water dump valve;
Signal $L_W$ providing liquid level data for the water level;
Signal $L_O$ providing liquid level data for the oil level;
Signal $LL_H$ providing liquid level data for the high liquid level; and
Signal $P_B$ providing back-pressure data and control over the regulator valve.

Upon collecting the data, the routine 300' of controller 300 moves along arrow 320 to Query 325. Query 325 asks whether the values of data collected in Box 315 predict or indicate a rising liquid level within the separator. More specifically, the Query 325 determines whether the data is indicative of rising pressure in the production tubing such as due to slug flow.

If the answer is "Yes," then the routine 300' moves along arrow 330 to Query 335. Query 335 asks if the separator pressure setpoint is at a maximum value. It is understood that this maximum value is keyed to the vessel's maximum safe operating pressure. If the setpoint is already at its maximum value, then the controller 300 makes no adjustment to the setpoint and the routine returns to the Start Block 305 according to line 340, and then line 342.

If, on the other hand, the setpoint is not at its maximum value, then the routine moves along arrow 350 and raises the setpoint to a new setpoint pressure. In one aspect, the setpoint pressure is raised 10 psi above the present setpoint pressure. Alternatively, the setpoint pressure may be increased by 20 psi above the present setpoint pressure. The routine then returns to the Start Block 305 according to line 360, and then line 342.

Returning to Query 325, if the values of data collected in Box 315 do not indicate a probability of a rising liquid level within the separator, then the routine 300' moves along arrow 370 to a new Query, which is Query 375. Query 375 asks whether the separator pressure setpoint is at a minimum value. This is a value set by the designer or the operator, considered to be a minimum value at which the separator can effectively operate to separate fluid components.

If the answer is "Yes," then the routine moves along arrow 380 and then line 342, back to the Start Block 305. On the other hand, if the answer is "No," then the routine 300' moves along arrow 390 to Block 395.

In Block 395, the pressure setpoint for the back-pressure regulator 250 is lowered to a new setpoint pressure. For example, the setpoint pressure may be lowered by 1 psi or, alternatively, by 2 psi below the present separator operating pressure. The routine 300' then moves back to the Start Block 305 according to arrow 392 and then line 342 to begin again.

Various techniques may be used in Query 325 to identify when the well is exhibiting behavior indicative of a rising liquid level in the separator. This enables the controller 300 to raise the setpoint pressure of the back-pressure regulator valve 251, thereby avoiding (or at least greatly limiting) ESD events.

To understand the operation of Query 325, further technical background concerning gas slugging is helpful. As noted above, horizontal unconventional wells exhibit a phenomenon referred to as "slugging." This is caused by a separation of the gas and liquid components in the horizontal section of the well during production. Depending on the geometry of the well, there can be significant volumes of separated gas collected in higher elevation portions of the lateral leg. Over time, pressure will build within the horizontal section until finally the gas escapes, causing a "burp" of high pressure gas.

The escaping gas will seek to travel to the surface through the production tubing. In so doing, it will push liquids ahead of it. This will manifest as a rapid increase in flow line pressure at the well head, then subsequently along the well's flow line and will cause reservoir fluids to enter the production separator at a high flow rate. In some instances, this event of slugging will overwhelm the separator and causing "flooding."

The result of gas slugging is an alternating series of liquid slugs and gas slugs, or some gassy liquid slugs (high GOR). To combat this, facility operators install high-level shut-down level switches (shown at 253 in FIG. 2) in well separators. Level switches 253 provide ESD protection. This, of course, is not typically necessary for vertical wells.

The movement of gas from the horizontal section of the well and the corresponding pushing of liquids can be described as a blowdown event. In this respect, the accumulations of gas in the lateral section will push liquids out of the wellbore, and also expand into the production tubing as they rise to the lower pressures at the surface. It is also observed that when a gas slug hits the vertical section of the well, it can significantly lower the pressure gradient along the tubing string. Given the larger diameter of the casing in the horizontal section compared to the smaller diameter tubing, a gas accumulation that is transferred from the casing to the tubing will occupy 3.5 to 5.0 times more length when in the tubing. If the pressure drops from 1,000 psia to 100 psia on the journey to the top of the well, the gas will occupy 35 to 50 times more length.

When the pressure gradient along the production tubing drops, bottom hole pressure (or "BHP") in the well is also reduced. The well will respond to this pressure loss by flowing at higher rates. This, in turn, can cause additional gas pockets to expand and displace their sealing liquid, increasing the tubing pressure and feeding the cycle. This phenomenon may be referred to herein as Post Liquid Slug Gas Release, or "PLSGR."

As the gas associated with the PLSGR enters the flowline for its journey to the facility, it first must displace (by imparting momentum to increase the velocity of) the previous liquid slug that now resides in the flowline. The friction caused by the high flowrate of the expanding gas results in higher flowline pressure at the well. The rapid arrival of liquid in the separator causes another high liquid level event. Such high liquid-level events are most undesirable as they usually result in well shutdown, or even upset production facilities. Given that separators are pressure vessels with a volume normally less than 25 barrels and that normal liquid dump valves are designed to move about 5 barrels per minute (210 gallons per minute), the introduction of, for example, a 30 barrel slug of liquid in less than a minute causes the high liquid level event.

A PLSGR may sometimes be accompanied by a slight drop in casing pressure. This occurs as the lowered tubing gradient yields a temporarily lower BHP and the casing blows down into the tubing.

Based on a study of slug flow and PLSGR, it has been determined that certain data trends associated with fluid flow can anticipate separator flooding before it occurs. This includes:
  (i) an increase in flowline pressure at or near the wellhead;
  (ii) a sudden increase in water liquid level position;
  (iii) a sudden increase in oil liquid level position;
  (iv) a sudden increase in fluid flow through the oil dump valve; and
  (v) a sudden increase in fluid flow through the water dump valve.

The controller 300 receives signals from sensors indicative of this data and processes the data to determine whether a high liquid-level event is imminent. To make this determination, one or more sensors may be used. Such sensors may include any of:
  a pressure sensor along the flow line proximate the well head;
  a pressure sensor along the flow line proximate the separator;
  a level control sensor at the oil-water interface within the separator;
  a level control sensor in the oil zone within the separator;
  a flowmeter at the water dump valve;
  a flowmeter at the oil dump valve
  the pressure transducer comprising the back-pressure regulator; or
  combinations thereof.

The pressure sensors, level control sensors and flowmeters all act as transducers, taking physical readings or measurements and converting them into electrical signals. The electrical signals are sent to the controller 300 using either electrical wires or wireless transmitters. Signals may be sent to the controller 300 every ½ second to 30 seconds, depending on engineering needs.

During operation, the controller 300 receives the signals from the various transducers in real time. The controller 300 may receive signals once per minute, or once per second, or even multiple times per second.

The controller 300 analyzes the signals as data to determine if there is an indication of a rising liquid level in the separator 200, or an imminently rising liquid level. Of course, the inverse is also true. The controller 300 analyzes the signals to determine if there is an indication of a falling liquid level in the separator 200, or an imminently falling liquid level. This is per Box 325 of FIG. 3.

As noted above, the back-pressure regulator valve is set to an operating pressure setpoint. During normal operations, the gas outlet will remain closed until the setpoint is reached, causing the regulator valve to temporarily open the gas outlet to maintain the setpoint. However, the controller monitors conditions along the flowline and in the separator to determine if conditions indicative of a liquid slug event (or rising liquid level) are occurring. In response to the signal processing, the controller 300 will send control signals, in real time. The control signals cause the setpoint pressure for the backpressure regulator valve to be temporarily increased. This prevents emergency shut-downs.

As noted above, the changes may be binary, meaning that the pressure setpoint is switched between a high setpoint (e.g., 300 psig) and a low setpoint (e.g., 75 psig). In this instance, the controller 300 controls a solenoid which determines which pressure controller signal is directed to the motor valve on the gas outlet 255. Alternatively, the changes may be incremental by raising the setpoint (e.g., by 20 psi per Box 355) or by lowering the setpoint (e.g., by 1 psi per Box 395). The controller 300 will not raise the setpoint to a level that is greater than the maximum allowable working pressure of the vessel. Adjusting the pressure setpoint coerces the fluids to leave the separator promptly.

Once liquid levels return to normal, the controller 300 will reduce the pressure setpoint of the back-pressure regulator valve 251 back to its normal operating pressure. In one aspect, the controller 300 will continue to seek the lowest operating pressure that will not cause liquid removal issues, possibly significantly lower than where the facility operator would set the vessel. The controller 300 will not lower the setpoint to a level that is below the minimum allowable working pressure of the vessel. With this arrangement, the production engineer is pleased with the low back-pressure on his well, while the facility operator is pleased that he no longer has troublesome shutdown events to contend with, i.e., callouts, overtime, restarting wells and compressors, etc.).

Different techniques may be employed for identifying a liquid slug and subsequent PLSGR event. The first relates to monitoring flowline pressure. Data analysis has revealed that a PLSGR event is observed by a rise in flowline pressure. Pressure is preferably monitored within a few feet of the well head. This well head pressure is compared to separator pressure, generating a pressure differential across a length of pipe. Preferably, pressure readings are made at least every 5 seconds.

Of interest, a pressure drop measurement across a simple wellhead choke has proved un-useful in detecting a PLSGR event due to the short length of the choke, and the large difference in pressure drop depending on whether gas or liquid is flowing through the choke. However, a pressure drop across a long flowline, e.g., greater than 100 feet, is not seeing instantaneous changes from liquid to gas; hence, the flowline pressure differential provides a better indicator of high liquid flow rates. Beneficially, this does not require the need for installing flowmeters along the pipe.

Various statistical methods can be used to evaluate the pressure drop from the well to the separator (flowline pressure drop), then predict high separator level events. For example, the controller might calculate a daily average flowline pressure drop when PLSGR is not deemed to be happening. Applicant believes that, depending on flow line length, when the well site flowline pressure exceeds the remote separator pressure by at least 40 psi, a high level event will soon occur.

Alternatively, the controller might calculate a Variance or a Standard Deviation of the real time pressure drop, and compare to the daily average flowline pressure drop for identifying PLSGR events. Applicant believes that, depending on flow line length, when the controller receives pressure signals from a pressure transducer placed along the flow line proximate the well head that exceed six standard deviations, a PLSGR event is happening.

Of interest, real time metering data may be valuable in determining the operating condition of the gas outlet valve. Since the separator pressure, valve position, and metered rate through this valve is known by the controller, engineering equations or statistical correlations can be utilized to send an alert when the trim in the control valve has begun to corrode or wear out. Oil and gas operators currently have no such technology in place, and this valve condition analysis is made possible by knowing the valve position (by measuring the pressure output of the pneumatic level controllers).

Another method of detecting a PLSGR is to directly monitor the liquid levels in the production separator. The challenge with this is that a liquid surge event happens so quickly, there may not be enough time for the controller to implement a higher pressure setpoint to prevent a high liquid-level event. Watching the levels in the separator return to their normal or average level is, however, a viable way to determine the end of the PLSGR and return the back-pressure regulator to its normal operating setpoint pressure.

For the present methods, throttling-style pneumatic level controllers are preferred for the water and oil dump valves. Pneumatic level controllers are designed to take a supply gas (typically 20 to 30 psig), and send a portion of this pressure to the pneumatic control valve, often termed a dump valve, or motor valve. Typical valve operation will employ fail closed globe style valves that begin to crack open at 5 psi, and are fully open at 20 to 30 psi. The pneumatic signal works against a spring in the motor valve, overcoming the force it is exerting to hold the valve closed. Due to the spring constant, this valve opens proportionally to the pressure signal. For example, a motor valve that begins to open at 5 psig and is fully open at 25 psig, will be halfway open at 15 psig.

As part of an improved separator herein, it is proposed to measure the pressure signal output from the throttling level controller. This provides an indirect way of monitoring the liquid levels in the production separator. The pressure signal output may be measured using a 4-20 mA pressure transducer. For example, during normal operation the output for the controller 300 may run from 8 to 10 psig. Should this value increase to 15, 20, then 25 psig, then a PLSGR is likely occurring.

Also as part of an improved separator herein, the controller calculates theoretical fluid volumes passing through the water dump valve and the oil dump valve using known engineering equations or statistical analysis. These values would be compared to actual metered volumes. The ratios will be indicative of valve trim condition. As the ratios change, an alert is implemented once a designated ratio for a dump valve is reached, indicating that the trim on a dump valve is in need of repair or replacement.

Another technique for monitoring dump valve condition relates to monitoring for the presence of liquid flowing through the dump cycles. If the separator experiences zero dump cycles in a day, yet measures, for example, 100 barrels of fluid, there are leaking dump valves.

A method of operating a production fluids separator is also provided herein. The method first includes providing a production fluids separator. The separator is preferably a three-phase fluid separator.

The production fluids separator comprises:
a wall having an inlet end, an upper surface and a lower surface;
an inlet configured to receive production fluids from the flow line;
a gas outlet residing along the upper surface of the vessel, wherein the gas outlet comprises a valve configured to open and close in response to control signals, wherein the outlet valve serves as a back-pressure regulator valve for the separator;
a water dump valve residing along the lower surface of the vessel, the water dump valve comprising an actuator configured to open and close the water dump valve in response to water level control signals;
an oil dump valve also residing along the lower surface of the vessel, the oil dump valve comprising an actuator configured to open and close the oil dump valve in response to oil level control signals; and
a controller.

The inlet to the separator is preferably along the inlet end. The wall of the separator forms a horizontal pressure vessel.

The controller is configured to periodically receive digital signals (as "data") indicative of fluid flow through the flow line, and then adjust a pressure setpoint in real time by sending signals to the gas outlet control valve for opening and closing the gas outlet. In this way, the controller is able to control back-pressure along a flow line from the well head and limit emergency shut-downs at the well.

The method also includes placing the inlet of the separator in fluid communication with a reservoir fluids flow line. The flow line extends from a well head, which in turn resides over a wellbore. The well head receives reservoir fluids from a production tubing within the wellbore.

It is understood that the wellbore has been completed for the production of hydrocarbon fluids.

As can be seen, an improved three-phase, high pressure separator is provided. The new separator operates without need of manually increasing the operating pressure in an attempt to prevent PLSGR events from causing flooding of the separator. In the current inventions, the controller recognizes when a PLSGR event is happening, or is about to happen, and then temporarily elevates the separator operating pressure by automatically adjusting a backpressure regulator valve setting. The well can then automatically return to normal backpressure following the PLSGR event. This results in improved well performance and profitability, in addition to less human intervention events to re-start wells following high liquid-level separator shutdowns.

Further, variations of the separator may fall within the spirit of the claims, below. For example, the controller may incrementally lower the setpoint pressure of the back-pressure regulator until data received by the controller is indicative of a rising liquid level. This is in lieu of automatically reverting back to a single operating pressure setpoint. In this way, a degree of optimization is provided. It will be appreciated that the inventions are susceptible to other modifications, variations and changes without departing from the spirit thereof.

I claim:

1. A fluids separator, comprising:
a wall having an inlet end, an upper surface and a lower surface;
an inlet in the wall configured to receive production fluids from a flow line associated with a well head;
a gas outlet residing along the upper surface of the wall, the gas outlet comprising a valve configured to open and close in response to control signals sent by a controller, wherein the valve serves as a back-pressure regulator valve for the separator;
a water dump valve residing along the lower surface of the vessel, the water dump valve comprising an actuator configured to open and close the water dump valve in response to water level control signals generated by a level control sensor in a water zone within the fluids separator;
an oil dump valve also residing along the lower surface of the vessel, the oil dump valve comprising an actuator configured to open and close the oil dump valve in response to oil level control signals generated by a level control sensor in an oil zone within the fluids separator; and
the controller, wherein:
the controller is configured to periodically receive separator data from sensors indicative of fluid flow through the flow line, and adjust a pressure setpoint for the back-pressure regulator valve in real time by sending signals $P_B$ to the back-pressure regulator valve for opening and closing the gas outlet, such that:
when the controller determines that the separator data is indicative of a rising level of oil and water in the separator, the controller sends a signal to increase the pressure setpoint for the back-pressure regulator valve; and
when the controller determines that the separator data is no longer indicative of a rising level of oil and water in the separator, the controller sends a signal to decrease the pressure setpoint for the back-pressure regulator valve;
thereby controlling back-pressure in the separator and limiting emergency shut-downs ("ESD's") at the well head.

2. The fluids separator of claim 1, wherein:
the separator is a three-phase fluid separator;
the separator further comprises a high liquid-level shut-down switch;
the inlet is at or proximate the inlet end; and
the flow line receives the production fluids from a production tubing below the well head;
and wherein the high liquid-level shutdown switch is configured to send an emergency shutdown ("ESD") signal to the well head when oil and water within the separator together reach a designated level.

3. The fluids separator of claim 2, wherein the wall forms a horizontal pressure vessel.

4. The fluids separator of claim 2, wherein the separator data comprises:
(i) signals generated by a pressure transducer located along the flow line at or near the well head;
(ii) signals generated by a pressure transducer in the separator;
(iii) the oil level control signals generated by the level control sensor within the oil zone;
(iv) the water level control signals generated by the level control sensor within the water zone;
(v) signals generated by a flowmeter at the oil dump valve;
(vi) signals generated by a flowmeter at the water dump valve; or
(vii) combinations thereof.

5. The fluids separator of claim 4, wherein periodically receiving the separator data means receiving the signals every ½ to 30 seconds.

6. The fluids separator of claim 4, wherein the controller is further configured to record instances where the ESD signals are sent.

7. The fluids separator of claim 4, wherein: the back-pressure regulator valve comprises:
a solenoid; and
two pressure controllers, wherein a first pressure controller operates at a first pressure setpoint and a second pressure controller operates at a second pressure setpoint, wherein the second pressure setpoint is higher than the first pressure setpoint;
and wherein:
when the controller determines that the separator data is indicative of a rising level of oil and water in the separator, the controller is configured to send a signal to the solenoid to actuate the second pressure controller to operate the back-pressure regulator valve at the second pressure setpoint; and
when the controller determines that the data is no longer indicative of a rising level of oil and gas in the separator, the controller is configured to send a signal to the solenoid to actuate the first pressure controller to operate the back-pressure regulator valve at the first pressure setpoint.

8. The fluids separator of claim 7, wherein actuating the first pressure controller to operate the back-pressure regulator valve at the first pressure setpoint comprises slowly returning the separator from the second pressure setpoint to the first pressure setpoint.

9. The fluids separator of claim 7, wherein the back-pressure regulator valve further comprises a differential pressure controller configured to limit opening of the back-pressure regulator valve at the gas outlet when transitioning the separator from the second pressure setpoint back to the first pressure setpoint, thereby preventing sudden pressure drops in the separator during the transitioning.

10. The fluids separator of claim 4, wherein:
the back-pressure regulator valve comprises:
an I to P transducer; and
a motor valve that provides variable pressure setpoints for the separator in response to signals from the controller.

11. The fluids separator of claim 4, further comprising:
the pressure transducer located at the separator and configured to transmit signals ($P_S$) to the controller indicative of pressure within the separator; and
the pressure transducer located along the flow line proximate the well head and configured to transmit signals ($P_F$) to the controller indicative of pressure along the flow line, and wherein the controller is configured to:
receive signals ($P_S$) and ($P_F$) as separator data indicative of fluid flow through the flow line;

periodically calculate a pressure differential between ($P_S$) and ($P_F$) as ($\Delta P$);

determine whether the ($\Delta P$) calculations are indicative of a post liquid slug gar release ("PLSGR") event; and if a PLSGR event is indicated, send a signal to the back-pressure regulator valve to increase the pressure setpoint, thereby increasing the pressure on the separator and flow line.

12. The fluids separator of claim 11, wherein a PLSGR event is indicated if ($\Delta P$) is greater than 40 psi.

13. The fluids separator of claim 11, wherein a PLSGR event is indicated if the controller receives signals ($P_F$) that exceed six standard deviations.

14. The fluids separator of claim 4, wherein:
the level control sensor in the oil zone comprises a throttling controller that generates a pressure signal ($L_O$) indicative of oil level within the separator;
the level control sensor in the water zone comprises a throttling controller that generates a pressure signal ($L_W$) indicative of water level within the separator; and
the controller is configured to receive the pressure signals ($L_O$), ($L_W$) from the throttling controllers of the level control sensors as at least part of the separator data.

15. The fluids separator of claim 14, wherein the controller is further configured to:
periodically compare the ($L_O$) and ($L_W$) data with average oil level and water level values, respectively; and
upon determining that the oil level and the water level have each returned to average values, send a signal to the back-pressure regulator valve to lower the pressure setpoint, thereby decreasing the pressure on the flow line.

16. The fluids separator of claim 15, wherein lowering the pressure setpoint comprises (i) lowering the pressure setpoint to a pre-programmed operating setpoint, or (ii) incrementally lowering the pressure setpoint towards a minimum pressure setpoint until the controller again receives data indicative of rising level of oil and water in the separator.

17. The fluids separator of claim 2, wherein:
the separator data comprises:
(i) signals generated by a pressure transducer located along the flowline at or near the well head;
(ii) signals generated by a pressure transducer in communication with the separator;
(iii) the oil level control signals generated by the level control sensor within the oil zone; and
(iv) the water level control signals generated by the level control sensor within the water zone; and
the controller is further configured to:
receive signals ($L_O$) from the level control sensor in the oil zone and signals ($L_W$) from the level control sensor in the water zone;
compare the ($L_O$) and ($L_W$) signals with pre-set oil level ($T_{O-A}$) and pre-set water level ($T_{W-A}$) values, respectively; and
based upon these comparisons, upon determining that the oil level and the water level have returned to at least the pre-set values ($T_{O-A}$), ($T_{W-A}$), send a signal to the back-pressure regulator valve to lower the pressure setpoint, thereby decreasing back-pressure on the flow line.

18. The fluids separator of claim 17, wherein the controller is further configured to:
monitor ($L_O$) and ($L_W$) signals to determine whether the oil and water levels within the separator are rising; and
upon determining that the oil level and the water level are rising, send a signal to the back-pressure regulator valve to increase the pressure setpoint.

19. A method of operating a production fluids separator comprising:
providing a production fluids separator, the production fluids separator comprising:
a wall having an inlet end, an upper surface and a lower surface;
an inlet at the inlet end configured to receive production fluids from a flow line extending from a well head;
a gas outlet residing along the upper surface of the vessel, the gas outlet comprising a valve configured to open and close in response to control signals, wherein the valve serves as a back-pressure regulator valve for the separator;
a water dump valve residing along the lower surface of the vessel, the water dump valve comprising an actuator configured to open and close the water dump valve in response to level control signals generated by a level control sensor in a water zone within the fluids separator;
an oil dump valve also residing along the lower surface of the vessel, the water dump valve comprising an actuator configured to open and close the oil dump valve in response to level control signals generated by a level control sensor in an oil zone within the fluids separator; and
a controller, wherein the controller is configured to periodically receive separator data indicative of fluid flow through the flow line, and adjust a pressure setpoint for the back-pressure regulator valve in real time by sending signals ($P_B$) to the back-pressure control valve for opening and closing the gas outlet;
placing the inlet of the separator in fluid communication with the flow line, with the well head receiving production fluids from a production tubing within a wellbore;
when the controller determines that the separator data is indicative of a rising level of oil and water in the separator, sending a signal to increase the pressure setpoint for the back-pressure regulator valve; and
when the controller determines that the separator data is no longer indicative of a rising level of oil and water in the separator, sending a signal to decrease the pressure setpoint for the back-pressure regulator valve;
thereby controlling back-pressure and limiting emergency shut-downs ("ESD's") at the well head.

20. The method of claim 19, wherein:
the separator is a three-phase fluid separator;
the separator further comprises a high liquid-level shut-down switch; and
the wall forms a horizontal pressure vessel;
and wherein the high liquid-level shutdown switch is configured to send an emergency shutdown ("ESD") signal to the well head when oil and water within the separator together reach a designated level.

21. The method of claim 20, wherein the production fluids flowing through the flow line comprise methane and any of (i) ethane, (ii) propane, (iii) butane, (iv) pentane, (v) hexanes and other higher chain hydrocarbons, (vi) carbon dioxide, (vii) nitrogen, (viii) hydrogen sulfide, or (ix) combinations of (i) through (viii).

22. The method of claim 20, wherein the separator data comprises:

(i) signals generated by a pressure transducer located along the flow line at or near the well head;
(ii) signals generated by a pressure transducer in communication with the separator;
(iii) the level control signals generated by the level control sensor within the oil zone;
(iv) the level control signals generated by the level control sensor within the water zone;
(v) signals generated by a flowmeter at the oil dump valve;
(vi) signals generated by a flowmeter at the water dump valve; or
(vii) combinations thereof.

23. The method of claim 22, wherein periodically receiving the data means receiving the signals every ½ to 30 seconds.

24. The method of claim 22, wherein:
the back-pressure regulator valve comprises:
a solenoid; and
two pressure controllers, wherein a first pressure controller operates at a first pressure setpoint and a second pressure controller operates at a second pressure setpoint, wherein the second pressure setpoint is higher than the first pressure setpoint;
and wherein:
when the controller determines that the separator data is indicative of a rising level of oil and water in the separator, the controller is configured to send a signal to the solenoid to actuate the second pressure controller to operate the back-pressure regulator valve at the second pressure setpoint; and
when the controller determines that the separator data is no longer indicative of a rising level of oil and water in the separator, the controller is configured to send a signal to the solenoid to actuate the first pressure controller to operate the back-pressure regulator valve at the first pressure setpoint.

25. The method of claim 24, wherein actuating the first pressure controller to operate the back-pressure regulator valve at the first pressure setpoint comprises slowly returning the separator from the second pressure setpoint to the first pressure setpoint.

26. The method of claim 21, further comprising:
providing a pressure transducer located at the separator and configured to transmit signals ($P_S$) to the controller indicative of pressure within the separator; and
providing a pressure transducer along the flow line proximate the well head configured to transmit signals ($P_F$) to the controller indicative of flow line pressure;
and wherein the controller is configured to:
receive signals ($P_S$) and ($P_F$) as separator data indicative of fluid flow through the flow line; periodically calculate a pressure differential between ($P_S$) and ($P_F$) as ($\Delta P$);
determine whether the ($\Delta P$) calculations are indicative of a post liquid slug gas release ("PLSGR") event; and
upon determining that a PLSGR is about to occur, send a signal to the back-pressure regulator valve to increase the pressure setpoint, thereby increasing the pressure on the flow line.

27. The method of claim 26, wherein a PLSGR event is indicated if ($\Delta P$) is greater than 40 psi.

28. The method of claim 20, wherein:
a throttling oil level controller generates a pressure signal ($L_O$) indicative of oil level within the separator;
a throttling water level controller generates a pressure signal ($L_W$) indicative of water level within the separator; and
the controller is configured to receive the pressure signals ($L_O$), ($L_W$) from the throttling oil level and water level controllers, respectively, as the separator data.

29. The method of claim 28, wherein the controller is further configured to:
receive signals ($L_O$) and ($L_W$) as data indicative of fluid flow through the flow line;
periodically compare ($L_O$) and ($L_W$) data with average oil level and water level values within the separator, respectively; and
upon determining that the oil level and the water level have each returned to their average values, send a signal to the back-pressure regulator valve to lower the pressure setpoint, thereby decreasing the pressure on the flow line.

30. The method of claim 29, wherein lowering the pressure setpoint comprises (i) lowering the pressure setpoint to a pre-programmed operating setpoint, or (ii) incrementally lowering the pressure setpoint towards a minimum pressure setpoint until the controller again receives data indicative of rising level of oil and water in the separator.

31. The method of claim 20, wherein:
the oil dump valve comprises a flowmeter for measuring volumes of fluid ($F_O$) passing through the oil dump valve for a period of time, and periodically sending signals to the controller indicative of ($F_O$); and
the water dump valve comprises a flowmeter for measuring volumes of fluid ($F_W$) passing through the water dump valve for the period of time, and periodically sending signals to the controller indicative of ($F_W$); and
the method further comprises:
comparing ($F_O$) with a volume of oil ($F_{O-A}$) that should pass through the oil dump valve in the period of time based upon a detected number of times the oil dump valve has released oil ("oil dump incidents") multiplied by an anticipated oil volume release per oil dump incident;
upon determining that ($F_O$) is greater than ($F_{O-A}$), sending an alert signal to an operator that trim associated with the oil dump valve is in need of repair or replacement;
comparing ($F_W$) with a volume of water ($F_{W-A}$) that should pass through the water dump valve in the period of time based upon a detected number of times the water dump valve has released water ("water dump incidents") multiplied by anticipated water volume release per water dump incident; and
upon determining that ($F_W$) is greater than ($F_{W-A}$), sending an alert signal to an operator that trim associated with the water dump valve is in need of repair or replacement.

32. The method of claim 31, further comprising:
in response to receiving an alert signal, replacing trim associated with the oil dump valve, replacing trim associated with the water dump valve, or both.

33. The method of claim 19, wherein:
the back-pressure regulator valve comprises:
an I to P transducer; and
a motor valve that provides variable back-pressure setpoints for the separator in response to control signals from the separator.

34. The method of claim 19, wherein the controller is further configured to record instances where the ESD signals are sent.

* * * * *